(12) United States Patent
Gentry (10) Patent No.: US 10,245,494 B1
(45) Date of Patent: Apr. 2, 2019

(54) TRICK BOARD TRAINING APPARATUS

(71) Applicant: Christopher Lee Gentry, Sealy, TX (US)

(72) Inventor: Christopher Lee Gentry, Sealy, TX (US)

(*) Notice: Subject to any disclaimer, the term of this patent is extended or adjusted under 35 U.S.C. 154(b) by 540 days.

(21) Appl. No.: 15/041,032

(22) Filed: Feb. 11, 2016

Related U.S. Application Data (60) Provisional application No. 62/127,732, filed on Mar. 3, 2015.

(51) Int. Cl.
*A63B 69/00* (2006.01)
*G09B 9/02* (2006.01)
*G09B 5/02* (2006.01)

(52) U.S. Cl.
CPC ............ *A63B 69/0093* (2013.01); *G09B 5/02* (2013.01); *G09B 9/02* (2013.01)

(58) Field of Classification Search
CPC . G09B 9/00; G09B 9/04; G09B 9/058; G09B 9/066; G09B 19/0038; G09B 19/162; G09B 19/167
USPC ........ 434/55, 61, 62, 247, 253, 255; 482/51, 482/142, 143, 146
See application file for complete search history.

(56) References Cited

U.S. PATENT DOCUMENTS

| | | | | |
|---|---|---|---|---|
| 3,912,260 A | * | 10/1975 | Rice | A63B 69/18 482/4 |
| 4,746,116 A | * | 5/1988 | Inada | A63B 19/04 482/145 |
| 4,961,574 A | | 10/1990 | Lew | |
| 5,163,828 A | | 11/1992 | Coddington | |
| 5,295,930 A | * | 3/1994 | Hogan | A63B 69/18 482/130 |
| 5,792,031 A | | 8/1998 | Alton | |
| 6,196,558 B1 | | 3/2001 | Simon | |

(Continued)

FOREIGN PATENT DOCUMENTS

| | | |
|---|---|---|
| CN | 202554870 U | 11/2012 |
| CN | 203609838 U | 5/2014 |
| DE | 19843472 A1 | 3/2000 |

OTHER PUBLICATIONS

SYCO "The Syco XT" http://www.sycoxt.com/syco-xt/description.php 2014.

(Continued)

*Primary Examiner* — Kurt Fernstrom
(74) *Attorney, Agent, or Firm* — Karen B. Tripp (57) ABSTRACT

A trick board training apparatus for training a trick board rider has an apparatus base and upright members connected to the apparatus base in a spaced-apart relationship defining a training zone therebetween. The trick board training apparatus also has a trick board suspension member for suspending a trick board within the training zone. The trick board suspension member has a first rotation mechanism for rotating the trick board about a first axis of rotation and a second rotation mechanism for rotating the trick board about a second axis of rotation, wherein the second axis of rotation is substantially perpendicular to the first axis of rotation when the first axis of rotation is substantially parallel to the ground. In the trick board training apparatus of the present invention, the trick board can be rotated about at least one of the first and second axes of rotation while remaining suspended.

14 Claims, 5 Drawing Sheets

(56) References Cited

U.S. PATENT DOCUMENTS

| | | | |
|---|---|---|---|
| 6,554,748 B2 | 4/2003 | Tollner | |
| 6,569,064 B1 | 5/2003 | Loane | |
| 6,929,478 B1 | 8/2005 | Spencer et al. | |
| 6,932,710 B1 | 8/2005 | Hartin | |
| 6,942,487 B2 | 9/2005 | Corbalis | |
| 7,198,590 B1 * | 4/2007 | Nicholas | A63B 21/015 434/253 |
| 7,357,767 B2 | 4/2008 | Tsai | |
| 7,465,262 B2 | 12/2008 | Ho | |
| 7,559,766 B2 * | 7/2009 | Epley | A61B 5/4863 434/34 |
| 7,614,987 B2 | 11/2009 | Guadagno | |
| 7,666,126 B2 * | 2/2010 | Rempe | A63B 22/18 482/121 |
| 7,892,151 B2 | 2/2011 | Colk et al. | |
| D651,677 S | 1/2012 | Shannon | |
| 8,105,164 B2 | 1/2012 | James-Herbert | |
| 8,585,559 B1 | 11/2013 | Shannon | |
| 8,672,770 B2 | 3/2014 | Matt | |
| 9,630,040 B1 * | 4/2017 | Louis | A63B 5/11 |
| 9,833,680 B2 * | 12/2017 | Claustre | A63B 69/0093 |
| 2001/0049322 A1 * | 12/2001 | Watanabe | A63B 69/18 482/8 |
| 2004/0224824 A1 * | 11/2004 | Lickle | A63B 26/003 482/51 |
| 2006/0009329 A1 * | 1/2006 | Toyama | A63B 21/023 482/51 |
| 2006/0270536 A1 * | 11/2006 | Tukada | A63B 22/16 482/146 |
| 2013/0196299 A1 | 8/2013 | Marroquin et al. | |
| 2013/0310235 A1 | 11/2013 | Carr | |

OTHER PUBLICATIONS

SYCO "Syco XT—Swing Boarding—Exciting fitness equipment is here" https://www.youtube.com/watch?v=XV9cS3Te_QI May 16, 2009.

Proludic "Aeroskate Skateboard Simulator (J2581)" http://www.externalworksindex.co.uk/entry/44282/Proludic/Aeroskate-Skateboard-Simulator-J2581/ 2015.

Proludic "Aeroskate from Proludic" https://www.youtube.com/watch?v=CmhZxwVcBTg May 18, 2011.

Clendenin "Ski and Snowboard Simulator" http://clendeninmethod.com/lessons/ 2015.

* cited by examiner

TRICK BOARD TRAINING APPARATUS

RELATED APPLICATION

This application claims priority to U.S. Provisional Application Ser. No. 62/127,732 filed Mar. 3, 2015.

FIELD OF THE INVENTION

The present invention relates to the field of board sports, in particular to board sports having trick maneuvers, and more particularly to an apparatus for training or practicing trick maneuvers.

BACKGROUND OF THE INVENTION

Sport boards, including skateboards, caster boards, vigorboards, waveboards, streetboards, brakeboards, flowboards, freeboards and variants thereof, typically involve riding a board on wheels along streets, in skateparks, sidewalk railings, stair banisters, empty pools, pool-like structures, and the like. Many of these facilities, whether formally for board sports or not, have hard surfaces. Accordingly, it is advisable to wear protective head and extremity gear. Nonetheless, there is potential for injuries sustained when a board rider, also referred to herein as a rider, loses contact with their board and falls on the hard surfaces.

Accordingly, there are many different sport board training apparatuses available to new riders or more experienced riders advancing their skills or technique. One class of training apparatuses includes those that have a fulcrum member for practicing balance while rocking back and forth on a board. A rider using this type of device trains his balance by staying on the board throughout the training session while moving his board and body in different ways. Examples of this type of apparatus include U.S. Pat. No. 6,554,748B2 (Tollner), which shows a device that can operate in ramp, teeterboard and rail grinding modes, U.S. Pat. No. 7,357,767B2 (Tsai) relating to a balance board with a moveable fulcrum, U.S. Pat. No. 7,614,987B2 (Guadagno) also relating to a balance board, and US 2013310235A1 (Carr) teaching a board that, in use, is attached to three suspension members that transition from compressed to extended positions as the rider applies more weight to one section of the board.

Beyond balance techniques, many board sports involve so-called tricks, where the rider manipulates the board, while moving and often at several feet above ground level, so as to lose contact with the board temporarily. Such tricks include, without limitation, ollies, flip tricks such as kickflips, 360 flips, double kickflips, triple kickflips, and the like.

For example, in a half-pipe skateboard ramp, a rider will create momentum to vertically climb the side of the halfpipe and then flip the board with his feet to transition to a descent of the half-pipe. At the time of conducting the trick maneuver, the rider is typically not in contact with the board and both board and rider are airborne above the top edge of the half-pipe. The objective is to re-contact the board with a proper foot placement to travel downwardly on the near-vertical face of the half-pipe. If a rider does not make proper re-contact with the trick board, he could be injured. It will therefore be understood by those familiar with the sport that it can be difficult to learn a new trick and the proper placement of one's feet on the board after being airborne to ensure a safe ride on the board back down to ground level. Riders often learn new tricks by repeatedly falling until they perfect the technique. Accordingly, other apparatuses have been developed specifically for practicing such trick maneuvers.

To that end, another class of training devices includes US 20130196299A1 (Marroquin) relating to a strap that is mounted around the board and provides a handle for the board rider while the rider does an aerial move, for example, on a half-pipe.

And yet another class of training apparatuses includes U.S. Pat. No. 6,196,558B1 (Simon), which describes an apparatus for practicing aerial snowboard maneuvers in which a trampoline is suspended in a frame. A snowboarder is secured to his snowboard by a pair of shoe straps and then practices jumping on the trampoline while attached to his snowboard. Similarly, U.S. Pat. No. 6,942,487B2 (Corbalis) illustrates a deck suspended within a frame by elastic cords, the deck having a rotational bearing system connected to the center of both the sport board and the deck, for swiveling a sport board in a plane parallel to the suspended deck.

U.S. Pat. No. 6,929,478B1 (Spencer et al) describes a frame structure for suspending a sports board in much the same manner as swing. It appears that the rider holds on to the swing ropes to practice moving the board hanging from those ropes. Similarly, U.S. Pat. No. 6,932,710B1 (Hartin) teaches a board swing with an upper grab bar, which allows the rider to move the board within the arcuate trajectory of the swing.

While these apparatuses give the board rider some sensation of aerial movements, the trick board is prohibited from moving in a manner as would be experienced in actual use, for example, at the top of a half-pipe or other structure.

In a manner similar to practicing a trick by holding on to railing alongside a sidewalk, U.S. Pat. No. 8,585,559B1 (Shannon) and U.S. Pat. No. D651677S (Shannon) illustrates a set of parallel bars having an unobstructed space between the bars for practicing tricks therebetween. With this apparatus, the skateboard is free to travel outside the space between the bars, which may be inconvenient during a training session.

There is a need for a trick board training apparatus that provides some control of the trick board to stay within the training space, while also allowing the board to move in a manner that more closely replicates its movement in actual use.

SUMMARY OF THE INVENTION

According to one aspect of the present invention, there is provided an apparatus for training a trick board rider, comprising: an apparatus base; a first upright member connected to the apparatus base and a second upright member connected to the apparatus base, the first upright member in spaced-apart relationship from the second upright member, defining a training zone therebetween; and a trick board suspension member for suspending a trick board within the training zone, the trick board suspension member having a first rotation mechanism for rotating the trick board about a first axis of rotation and a second rotation mechanism for rotating the trick board about a second axis of rotation, wherein the second axis of rotation is substantially perpendicular to the first axis of rotation when the first axis of rotation is substantially parallel to the ground, whereby the trick board can be rotated about at least one of the first and second axes of rotation while remaining suspended.

BRIEF DESCRIPTION OF THE DRAWINGS

The apparatus of the present invention will be better understood by referring to the following detailed description of preferred embodiments and the drawings referenced therein, in which.

DETAILED DESCRIPTION OF THE INVENTION

The present invention provides an apparatus for training a trick board rider to move a trick board in a manner more closely replicating board movement in actual use. The board rider is able to learn or practice the feet and leg positions and movements required to make the trick maneuver, as well as a safe and stylish landing on the board after the maneuver. The muscle memory that is needed to make and land the maneuvers builds as a board rider trains on the apparatus.

The trick board training apparatus of the present invention can be adapted for use with a trick board selected from the group consisting of a skateboard, a caster board, a vigorboard, a waveboard, a streetboard, a brakeboard, a flowboard, a freeboard and variants thereof.

The trick board training apparatus of the present invention can be used by a rider to train and practice tricks, where the rider manipulates the board, so as to lose contact with the board temporarily. Such tricks include, without limitation, ollies, flip tricks such as kickflips, 360 flips, double kickflips, triple kickflips, and the like.

Figure 1:
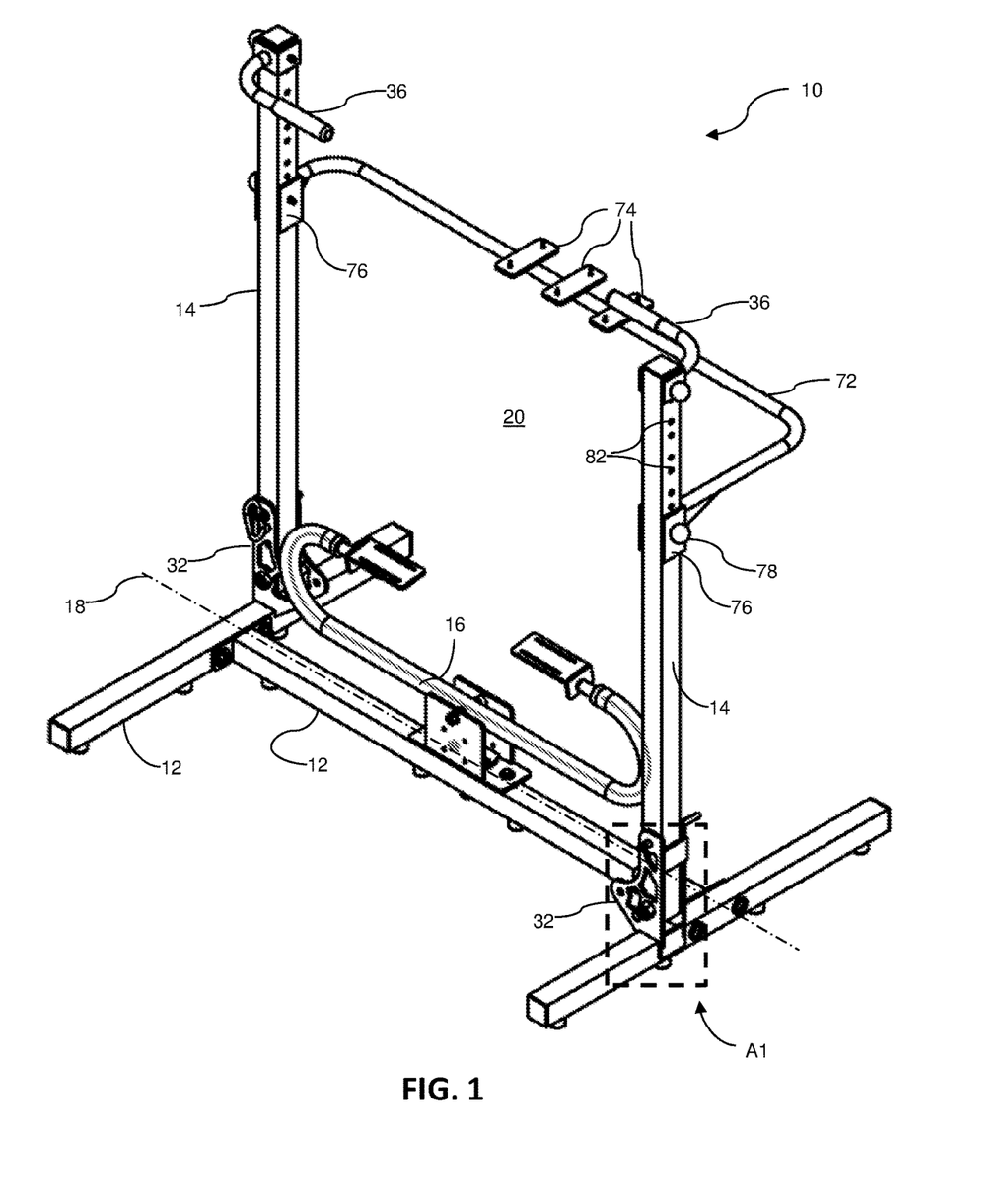
FIG. 1 is a perspective view of a trick board training apparatus of the present invention illustrating some preferred embodiments as will be described in more detail below.

Referring now to FIG. 1, a trick board training apparatus 10 has an apparatus base 12 and upright members 14 connected to the apparatus base 12. The upright members 14 are spaced-apart from each other, defining a training zone 20 therebetween. The trick board training apparatus 10 also has a trick board suspension member 16 for suspending a trick board (not shown) within the training zone 20. As shown more clearly in FIG. 2, the trick board suspension member 16 has a first rotation mechanism 22 for rotating the trick board (not shown) about a first axis of rotation 24 and a second rotation mechanism 26 for rotating the trick board about a second axis of rotation 28. The second axis of rotation 28 is substantially perpendicular to the first axis of rotation 24 when the first axis of rotation 24 is substantially parallel to the ground. The trick board suspension member 16 allows the trick board to be rotated about at least one of the first axis of rotation 24 and the second axis of rotation 28 while remaining suspended.

In the embodiment shown in FIG. 1, the apparatus base 12 has a pair of parallel side arms with a crossbar positioned between the two side arms in an I-shaped configuration. This configuration is a preferred embodiment for a portable trick board training apparatus 10. However, it will be understood that other configurations of the apparatus base 12 are possible without departing from the spirit of the present invention.

Figure 3A:
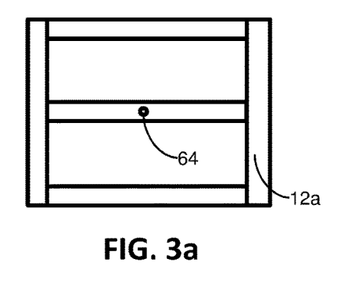
FIGS. 3a-3f are top plan views of variants of an apparatus base of a trick board training apparatus of the present invention.
Figure 3B:
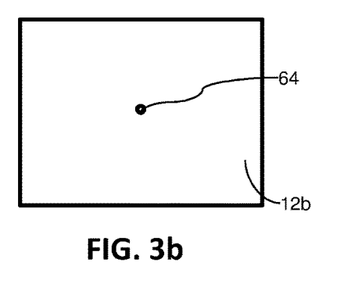
Figure 3C:
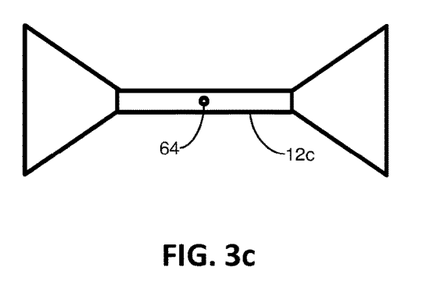
Figure 3D:
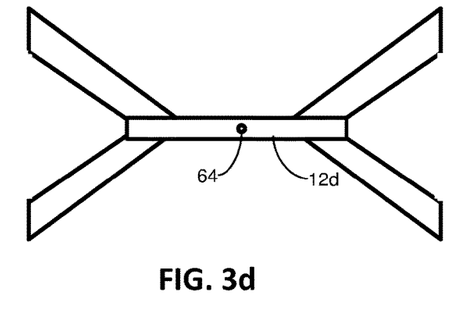
Figure 3E:
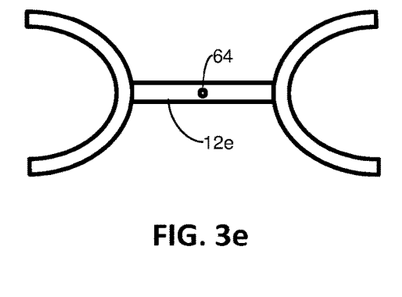
Figure 3F:
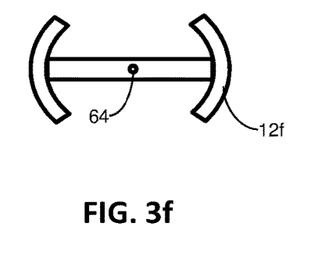

As examples, without limitation, FIGS. 3a through 3f illustrate variants of the apparatus base 12. FIG. 3a shows an apparatus base 12a that has a bisected rectangular configuration, with additional cross members as compared to the apparatus base 12 shown in FIG. 1. In FIG. 3b, an apparatus base 12b also has a rectangular configuration with a substantially solid base. In FIG. 3c, an apparatus base 12c has a substantially bowtie configuration, while FIG. 3d shows an apparatus base 12d with a substantially X-shaped configuration. FIGS. 3e and 3f show an apparatus base 12e, 12f with arcuate arms facing outwardly and inwardly, respectively.

The apparatus base 12 and variants 12a-12f thereof may be constructed from steel, aluminum, plastic, carbon fiber and the like. These materials of construction may be in the form of plate, rods, tubes and combinations thereof. Components of the apparatus base 12 and variants 12a-12f may be made as a unitary structure or fixed permanently, for example by welding or riveting, semi-permanently, for example with nuts and bolts, or temporarily, for example with lock pins, biased connectors, magnetic connectors, and the like. Hereinafter, reference to apparatus base 12 will be understood to include variants of the apparatus base 12a-12f.

Figure 1A:
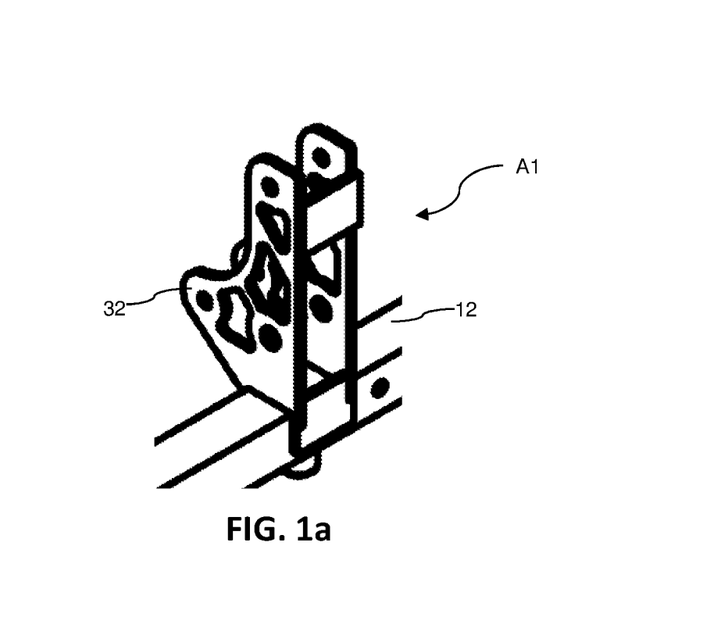
FIG. 1a is an enlarged view of a portion A1 of FIG. 1.

Referring again to FIG. 1, the trick board training apparatus 10 has upright members 14 connected to the apparatus base 12. In the embodiment shown in FIG. 1, the upright members 14 are offset from one another on either side of a lateral centerline 18 of the apparatus base 12. This embodiment is advantageous for portability since, in combination with a pivot brace 32 (shown more clearly in FIG. 1a, which illustrates an enlarged view of portion A1 of FIG. 1), the upright members 14 can be pivoted downwardly towards the apparatus base 12 without interfering with one another.

While it is preferable that the upright members 14 are offset from one another, it is within the spirit of the present invention to have the upright members 14 directly opposing one another in line with the lateral centerline 18 of the apparatus base 12.

As mentioned above, the upright members 14 are advantageously attached to the apparatus base 12 through pivot brace 32 to allow the trick board training apparatus 10 to be collapsed into a more readily portable form. Other mechanisms for achieving a pivoting upright member 14 relative to the trick board training apparatus will be apparent to those skilled in the art. Alternatively, the upright members 14 may be disassembled from the trick board training apparatus 10 into component parts for portability with lock pins, biased connectors, collar connectors, magnetic connectors, and the like.

However, in more permanent installations or where portability is not an issue, it is possible to construct the upright members 14 as a unitary structure with the apparatus base 12. Alternatively, the upright members 14 can be fixed to the apparatus base 12 permanently, for example by welding or riveting, or semi-permanently, for example with nuts and bolts, and the like.

While it is possible to use the trick board training apparatus 10 by holding onto the upright members 14, for example, with a grip similar to that of holding a ski pole, the trick board training apparatus 10 preferably has a set of grab bars 36. As illustrated in FIG. 1, the grab bars 36 are oriented on opposing sides of the upright members 14 to more readily enable a rider to twist his torso while practicing a trick maneuver.

Figure 5:
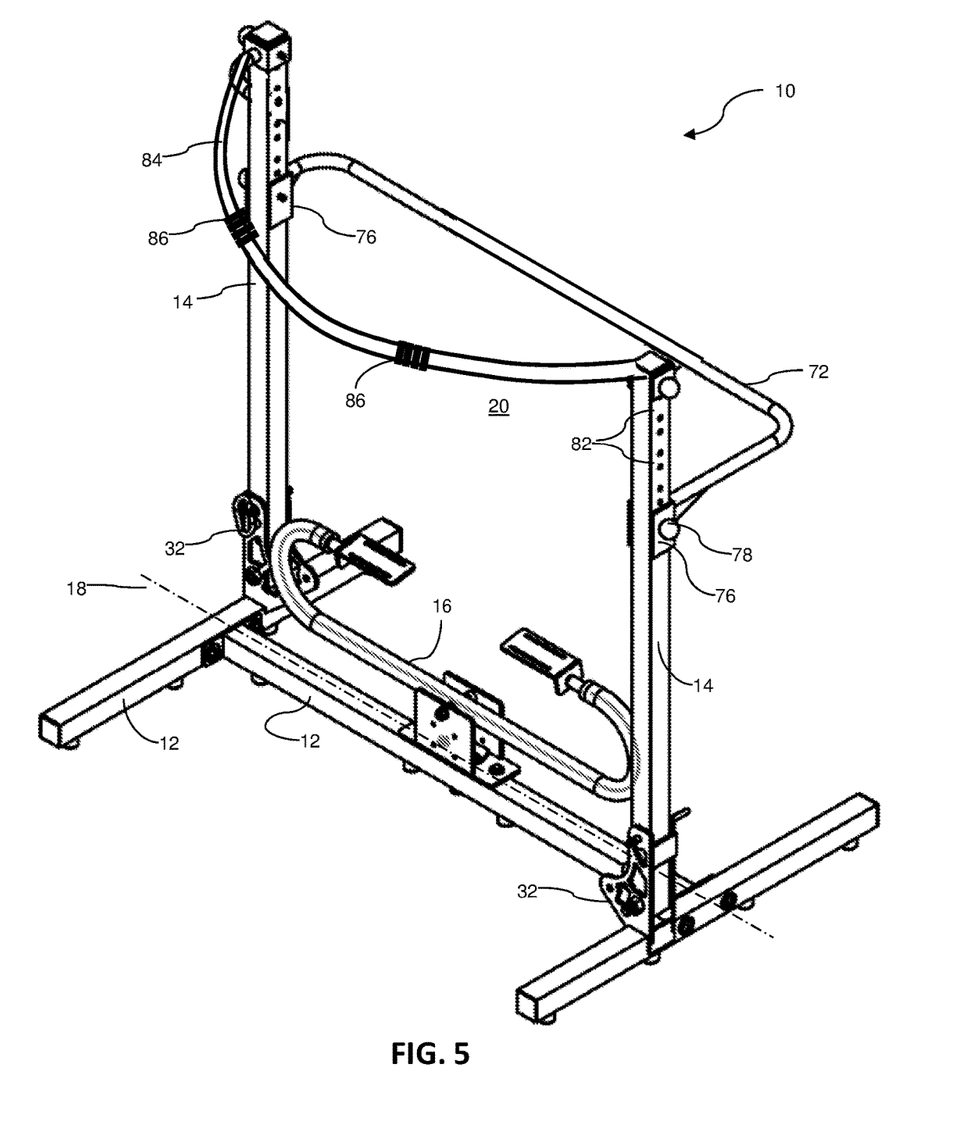
FIG. 5 is a perspective view of another embodiment of a trick board apparatus of the present invention having an arcuate grab bar.

In another embodiment, shown in FIG. 5, the trick board training apparatus 10 may have an arcuate grab bar 84 extending from one upright member 14 to the other upright member 14. The arcuate grab bar 84 preferably has handle grips 86 that are moveable along the grab bar 84 with roller bearings or the like to better replicate body movement during a trick maneuver.

As discussed above, the trick board suspension member 16 of the trick board training apparatus 10 has a first rotation mechanism 22 for rotating the trick board (not shown) about a first axis of rotation 24 and a second rotation mechanism 26 for rotating the trick board about a second axis of rotation 28. The second axis of rotation 28 is substantially perpendicular to the first axis of rotation 24 when the first axis of rotation 24 is substantially parallel to the ground. The trick board suspension member 16 allows the trick board to be rotated about at least one of the first axis of rotation 24 and the second axis of rotation 28 while remaining suspended.

Figure 4:
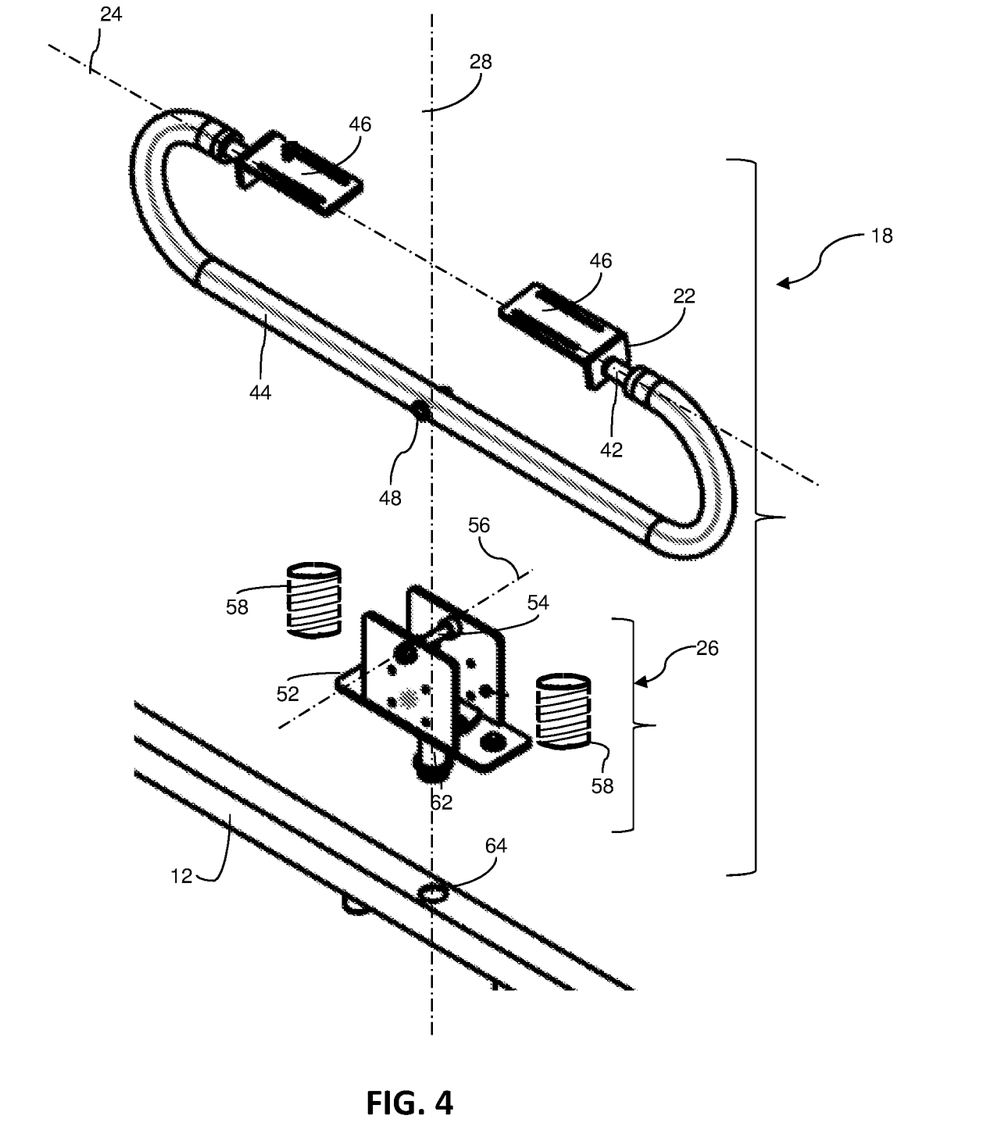
FIG. 4 is an exploded view of a trick board suspension member of FIG. 1.

FIG. 4 is an exploded view of the trick board suspension member 16. The first rotation mechanism 22 includes a rotating pin 42 that rotatably connects a trick board holder 44 and a trick board coupler 46. The trick board coupler 46 shown in FIG. 4 is a bracket for bolting a wheel mounting plate (not shown) of a trick board. Other mechanisms for coupling the trick board include friction fit, magnetic couplers, biasing couplers, and the like. The first rotation mechanism 22 allows the trick board to freely spin 360 degrees about the first axis of rotation 24, in either a clockwise or counterclockwise direction.

The second rotation mechanism 26 includes a housing 52 with a spindle 54 for engaging a hole 48 passing from one side to the other at the lower center portion of the trick board holder 44. This connection allows the some degree of rotation about a third axis of rotation 56. This allows some give in the trick board when impacted by the rider's feet. To avoid the trick board leaning to one side or the other, the trick board suspension member 16 preferably also has a biasing element to help keep the board substantially level when the trick board training apparatus is at rest. In FIG. 4, the biasing element is a pair of springs 58 that are seated on either side of the spindle 54 within the housing 52 of the second rotation mechanism 26. Springs 58 compress against the force of the trick board holder 44 when the rider lands on or presses the trick board downwardly on one side or the other. The housing 52 also has a downwardly depending rotation pin 62 adapted to be rotatably received in a hole 64 in apparatus base 12. The second rotation mechanism 26 allows the trick board to freely spin 360 degrees about the second axis of rotation 28, in either a clockwise or counterclockwise direction.

Figure 2:
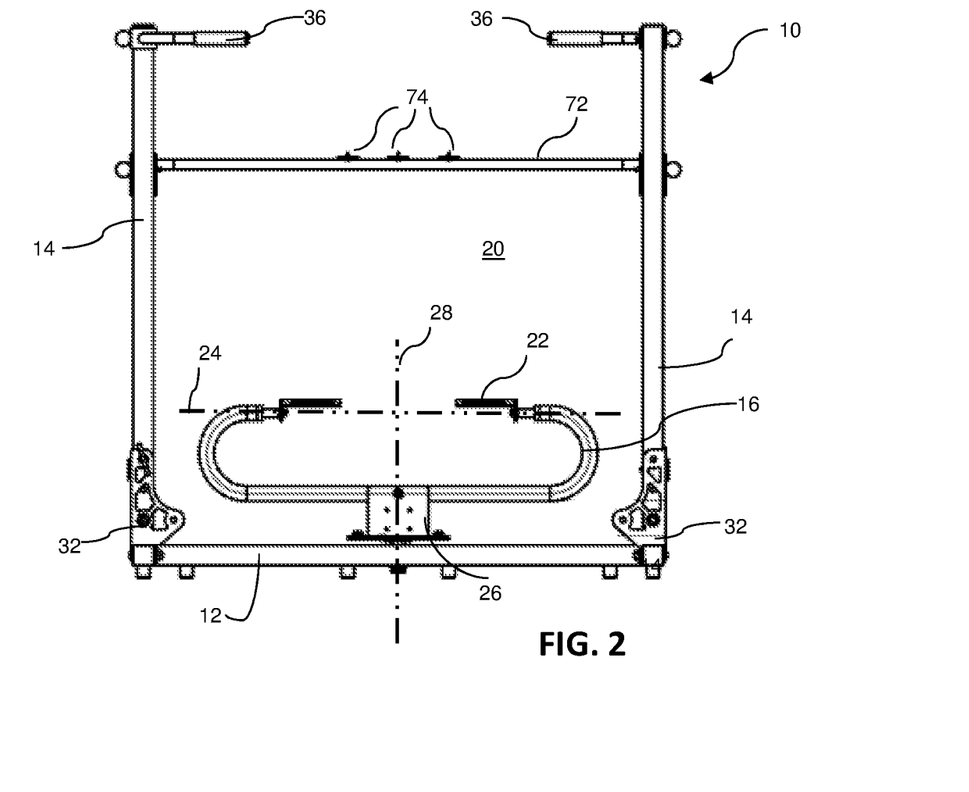
FIG. 2 is a front elevation view of a trick board training apparatus of the present invention, illustrating a first axis of rotation and a second axis rotation of a trick board.

In a preferred embodiment, the trick board training apparatus 10 may be provided with a seat, backrest or padded bar to sit on or lean against when practicing trick maneuvers. In the embodiment shown in FIGS. 1 and 2, a rider support member 72 is attached to the upright members 14. The rider support member 72 shown in FIGS. 1 and 2 is provided with seat brackets 74 for mounting a padded seat (not shown). Alternatively, the rider support member 72 may be provided without seat brackets 74, as shown in the embodiment in FIG. 5, so that the rider can merely lean against the rider support member 72 while training. In this embodiment, the rider support member 72 may be provided with padding material to increase comfort. In yet another embodiment, the seat brackets 74 could be mounted vertically to support a back rest (not shown).

However, the most preferred embodiment has a seat mounted on seat brackets 74 of the rider support member 72. This preferred embodiment allows a rider who has been injured to remain seated while practicing feet movement to maintain muscle memory until he has recovered from his injury, for example.

The rider support member 72 is preferably height-adjustable. The height may be adjusted, for example as shown more clearly in FIG. 1, with a collar 76 adapted to receive the upright member 14 and a locking pin 78 that engages holes 82 provided in the upright member 14. Other mechanisms for adjusting the height of the rider support member will be apparent to those skilled in the art.

In a further embodiment, the trick board training apparatus 10 is equipped with motion sensors for communicating with software for determining desired performance parameters including, without limitation, speed, acceleration, location, rotation, and combinations thereof. More preferably, the sensors communicate with real-time animation software through real-time motion capture so that the rider can visually review his performance and/or to visually compare his performance to a trainer video.

While there has been illustrated and described particular embodiments of the present invention, it will be appreciated that numerous changes and modifications will occur to those skilled in the art, and it is intended in the appended claims to cover those changes and modifications which fall within the true spirit and scope of the present invention. Thus, the scope of the invention should be determined by the appended claims and their legal equivalents, rather than by the examples given.

I claim:

1. An apparatus for use with a trick board in training a trick board rider, comprising:
   an apparatus base;
   a first upright member connected to the apparatus base and a second upright member connected to the apparatus base, the first upright member in spaced-apart relationship from the second upright member, defining a training zone there between; and
   a trick board suspension member for suspending the trick board within the training zone, the trick board suspension member having a first rotation mechanism for rotating the trick board about a first axis of rotation and a second rotation mechanism for rotating the trick board about a second axis of rotation, wherein the second axis of rotation is substantially perpendicular to the first axis of rotation when the first axis of rotation is substantially parallel to the ground,
   whereby the trick board can be rotated about at least one of the first and second axes of rotation while remaining suspended.

2. The apparatus for use with a trick board in training a trick board rider according to claim 1, wherein the trick board suspension member is rotatably connected to the apparatus base at a point along the second axis of rotation.

3. The apparatus for use with a trick board in training a trick board rider according to claim 1, wherein the trick board can be rotated 360 degrees about the first axis of rotation.

4. The apparatus for use with a trick board in training a trick board rider according to claim 1, wherein the trick board can be rotated 360 degrees about the second axis of rotation.

5. The apparatus for use with a trick board in training a trick board rider according to claim 1, wherein the second rotation mechanism comprises a pair of biasing members for allowing partial rotation of the trick board about a third axis of rotation substantially perpendicular to the second axis of rotation.

6. The apparatus for use with a trick board in training a trick board rider according to claim 1, wherein the trick board is selected from the group consisting of a skateboard, a caster board, a vigorboard, a waveboard, a streetboard, a brakeboard, a flowboard, a freeboard.

7. The apparatus for use with a trick board in training a trick board rider according to claim 1, further comprising a rider support member connected between the first upright member and the second upright member, the support member being selected from the group consisting of a seat, a backrest, a padded bar and combinations thereof, whereby a rider is supported at an elevation above the trick board suspension member.

8. The apparatus for use with a trick board in training a trick board rider according to claim 7, wherein the rider support member is height-adjustable.

9. The apparatus for use with a trick board in training a trick board rider according to claim 1, wherein the apparatus base has a configuration selected from the group consisting of an I-shape, a bisected rectangular shape, a rectangular shape with a substantially solid base, a substantially bowtie shape, a substantially X-shaped, outwardly facing arcuate arms, inwardly facing arcuate arms, and combinations thereof.

10. The apparatus for use with a trick board in training a trick board rider according to claim 1, wherein the first upright member is offset from the second upright member on opposing sides of a lateral centerline of the apparatus base.

11. The apparatus for use with a trick board in training a trick board rider according to claim 1, further comprising a grab bar engaging at least one of the first upright member and the second upright member.

12. The apparatus for use with a trick board in training a trick board rider according to claim 1, wherein the first upright member and the second upright member are pivotably connected to the apparatus base.

13. The apparatus for use with a trick board in training a trick board rider according to claim 1, further comprising motion sensors for communicating with software for determining desired performance parameters selected from the group consisting of speed, acceleration, location, rotation, and combinations thereof.

14. The apparatus for use with a trick board in training a trick board rider according to claim 13, wherein the sensors communicate with real-time animation software through real-time motion capture so that the rider can visually review his performance.

* * * * *